(12) United States Patent
Liu

(10) Patent No.: US 9,716,750 B2
(45) Date of Patent: Jul. 25, 2017

(54) SYSTEM FOR PROVIDING CONTENT FROM SERVERS BASED ON USER RESPONSES TO CONTENT INQUIRIES

(71) Applicant: Tencent Technology (Shenzhen) Company Limited, Shenzhen (CN)

(72) Inventor: Huazhong Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 362 days.

(21) Appl. No.: 14/677,881

(22) Filed: Apr. 2, 2015

(65) Prior Publication Data

US 2015/0215393 A1    Jul. 30, 2015

Related U.S. Application Data

(63) Continuation of application No. PCT/CN2014/084658, filed on Aug. 18, 2014.

(30) Foreign Application Priority Data

Aug. 28, 2013    (CN) .......................... 2013 1 0380379

(51) Int. Cl.
*G06Q 30/02*    (2012.01)
*H04L 29/08*    (2006.01)
(Continued)

(52) U.S. Cl.
CPC ...... *H04L 67/104* (2013.01); *G06F 17/30283* (2013.01); *G06Q 30/0239* (2013.01);
(Continued)

(58) Field of Classification Search
CPC ........... G06Q 30/0239; G06Q 30/0241; G06Q 30/0255; G06Q 30/0257; G06Q 30/0271;
(Continued)

(56) References Cited

U.S. PATENT DOCUMENTS

2001/0044751 A1*    11/2001    Pugliese, III .......... G06Q 30/02 705/14.1
2002/0120666 A1*    8/2002    Landsman ............. G06Q 30/02 709/200
(Continued)

FOREIGN PATENT DOCUMENTS

CN    101431485 A    5/2009
CN    101442554 A    5/2009
(Continued)

OTHER PUBLICATIONS

Tencent Technology, ISRWO, PCT/CN2014/084658, Nov. 19, 2014, 8 pgs.
(Continued)

*Primary Examiner* — Le H Luu
(74) *Attorney, Agent, or Firm* — Morgan, Lewis & Bockius LLP

(57) ABSTRACT

The present application discloses a method for providing media content in an interactive manner. A first server provides first content to a remote client. When it is determined that the first content meets a predefined condition, the first server suspends providing the first content to the remote client, and obtains media content and corresponding content inquiries from a second server that is distinct from the first server. The media content and the content inquiries are provided to the remote client that is configured to render the media content and the content inquiries on its display to the user and receive user responses to the content inquires. Then, the first server receives the user responses from the remote client, updates the user's account when the user responses satisfy predefined response criteria, and resumes providing the first content to the remote client based on the updated user account.

20 Claims, 6 Drawing Sheets

(51) Int. Cl.
*G06F 17/30* (2006.01)
*H04L 29/06* (2006.01)

(52) U.S. Cl.
CPC ..... *G06Q 30/0241* (2013.01); *G06Q 30/0255* (2013.01); *G06Q 30/0257* (2013.01); *G06Q 30/0271* (2013.01); *G06Q 30/0277* (2013.01); *H04L 67/06* (2013.01); *H04L 67/42* (2013.01)

(58) Field of Classification Search
CPC ................ G06Q 30/0277; G06Q 30/02; G06F 17/30283; G06F 17/30867; G06F 17/30873; G06F 9/4443; H04L 67/06; H04L 67/104; H04L 1/0002; H04N 1/00228
See application file for complete search history.

(56) References Cited

U.S. PATENT DOCUMENTS

| | | | | |
|---|---|---|---|---|
| 2003/0229900 | A1* | 12/2003 | Reisman | G06F 17/30873 725/87 |
| 2004/0088348 | A1* | 5/2004 | Yeager | H04L 67/104 709/202 |
| 2005/0131944 | A1* | 6/2005 | Patrick | G06F 17/30867 |
| 2006/0236337 | A1* | 10/2006 | Zoller | G06F 9/4443 725/37 |
| 2006/0253330 | A1* | 11/2006 | Maggio | G06Q 30/02 705/14.2 |
| 2009/0089212 | A1 | 4/2009 | Morohoshi | |
| 2010/0105454 | A1* | 4/2010 | Weber | G06Q 30/02 463/1 |
| 2010/0161679 | A1* | 6/2010 | Harrang | H04L 1/0002 707/802 |
| 2011/0150362 | A1* | 6/2011 | Mitra | H04N 1/00228 382/286 |

FOREIGN PATENT DOCUMENTS

| | | |
|---|---|---|
| CN | 101957965 A | 1/2011 |
| CN | 102542491 A | 7/2012 |

OTHER PUBLICATIONS

Tencent Technology, IPRP, PCT/CN2014/084658, Mar. 1, 2016, 5 pgs.

* cited by examiner

On a first server having one or more processors and memory storing one or more programs for execution by the one or more processors: — 30

Determining whether a predefined condition is met while providing first content to a remote client, wherein the remote client is configured to render the first content on its display to a user and detect user interactions with the first content and report the user interactions to the first server 32

In accordance with a determination that the predefined condition is met: 34

Suspending providing the first content to the remote client 36

Obtaining media content and one or more content inquiries from a second server that is distinct from the first server, wherein the one or more content inquiries are associated with the media content 38

Providing the media content and the content inquiries to the remote client, wherein the remote client system is configured to render the media content and the content inquiries on its display to the user and receive user responses to the content inquires 40

Receiving the user responses to the content inquires from the remote client 42

Updating the user's account based on the user responses to the content inquires when the user responses satisfy predefined response criteria 44

Resuming providing the first content to the remote client based on the updated user account 46

FIG. 2

SYSTEM FOR PROVIDING CONTENT FROM SERVERS BASED ON USER RESPONSES TO CONTENT INQUIRIES

RELATED APPLICATIONS

This application is a continuation application of PCT Patent Application No. PCT/CN2014/084658, entitled "METHOD AND SYSTEMS FOR PROVIDING MEDIA CONTENT" filed on Aug. 18, 2014, which claims priority to Chinese Patent Application No. 201310380379.9, entitled "MEDIA SHARING METHOD, APPARATUS AND SYSTEM," filed on Aug. 28, 2013, both of which are incorporated by reference in their entirety.

TECHNICAL FIELD

The disclosed implementations relate generally to information technology, and more particularly to providing media content to a client device.

BACKGROUND

Rapidly growing computer technology and network technology have made the Internet and instant messaging service available to average people, and started to play an increasingly important role in their everyday life. Furthermore, as wireless network technology is widely accessible, more and more mobile software applications have also been developed to serve the need of average Internet users better.

As our society enters an information age, competition among businesses has changed to involve many different aspects, such as brand name, product function, product quality, and public image. Such a change of the competition is closely related to different communication and advertising options that have emerged due to the rapidly growing computer and network technology. Basic elements of communication and advertising (e.g., content provider, content, content receiver and content format) are normally limited by and reflect the culture and the technology at a specific period of time in a specific region.

In existing communication for internet media delivery, various media service providers (e.g., Yahoo or YouTube) provides media content to their clients by incorporating a link to media content on its webpage scripts or media player. These media service providers manage the media content provided by different content providers via a media management system. When a user browses a webpage or video, the corresponding webpage or the media player will automatically extracts the linked media content, and display the media content according to a predetermined media format. These content providers are optionally distinct from the media service providers, and the media service providers may thereafter claim service credits from the content providers after they have delivered the content successfully to the intended audience.

However, most existing communication processes for delivering media content to intended audience are one-directional processes, and the intended audience cannot interact with the media service provider or the content providers based on the medium content. Rather, the audience merely receives the media content passively. Thus, the information delivery efficiency is significantly compromised between a media service provider and its audience.

SUMMARY

The above deficiencies and other problems associated with the conventional approaches of information technology are reduced or eliminated by the application disclosed below. In some embodiments, the application is implemented in a server system that has one or more processors, memory and one or more modules, programs or sets of instructions stored in the memory for performing multiple functions. Instructions for performing these functions may be included in a computer program product configured for execution by one or more processors.

One aspect of the application is a method that is implemented on a first server for providing media content. The method includes determining whether a predefined condition is met while providing first content to a remote client, and the remote client is configured to render the first content on its display to a user and detect user interactions with the first content and report the user interactions to the first server. The method further includes in accordance with a determination that the predefined condition is met, suspending providing the first content to the remote client, and obtaining the media content and one or more content inquiries from a second server that is distinct from the first server, wherein the one or more content inquiries are associated with the media content. The method further includes in accordance with a determination that the predefined condition is met, providing the media content and the content inquiries to the remote client, wherein the remote client system is configured to render the media content and the content inquiries on its display to the user and receive user responses to the content inquires; receiving the user responses to the content inquires from the remote client; updating the user's account based on the user responses to the content inquires when the user responses satisfy predefined response criteria; and resuming providing the first content to the remote client based on the updated user account.

Another aspect of the application is a server system that includes one or more processors and memory having at least one program (including instructions) stored thereon, which when executed by the one or more processors cause the processors to perform operations in the method described above.

Another aspect of the application is a non-transitory computer readable storage medium that stores at least one program configured for execution by at least one processor of a server system. The at least one program includes instructions for causing the server system to perform the operations in the method described above.

Other embodiments and advantages may be apparent to those skilled in the art in light of the descriptions and drawings in this specification.

BRIEF DESCRIPTION OF DRAWINGS

The aforementioned implementation of the application as well as additional implementations will be more clearly understood as a result of the following detailed description of the various aspects of the application when taken in conjunction with the drawings. Like reference numerals refer to corresponding parts throughout the several views of the drawings.

FIG. 2 illustrates a flow diagram representing a method for providing media content in accordance with some embodiments of the application.

DETAILED DESCRIPTION

Figure 1:
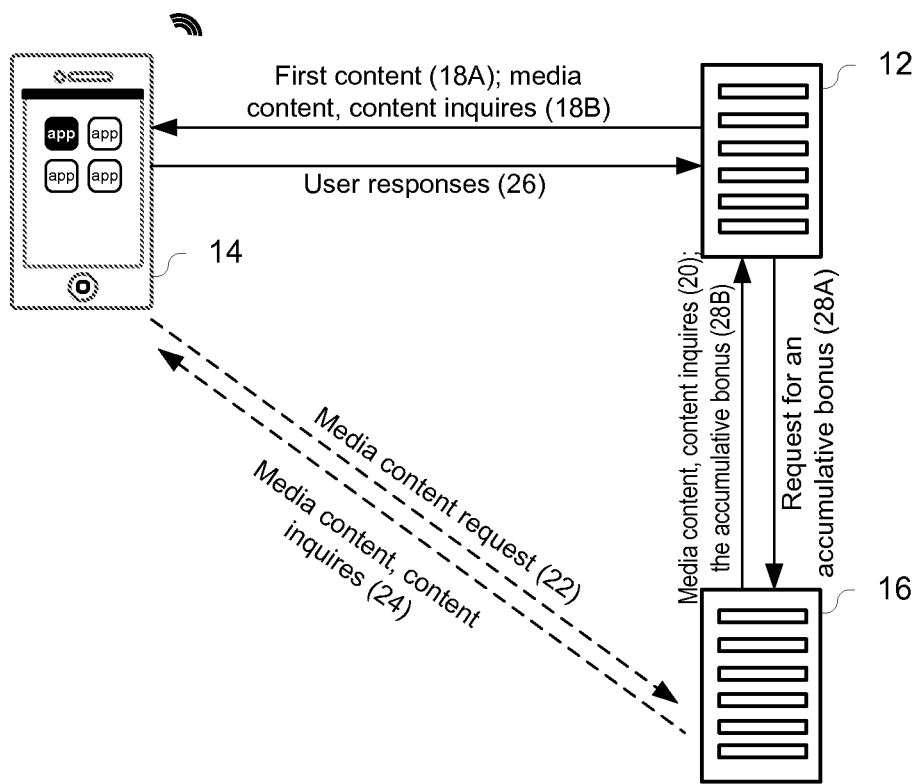
FIG. 1 illustrates an exemplary media content delivery system that provides media content (e.g., media content and media content inquires) to a client device in an interactive manner in accordance with some embodiments of the application.

The aforementioned implementation of the present application as well as additional implementations will be more clearly understood as a result of the following detailed description of the various aspects of the present application when taken in conjunction with the drawings. Like reference numerals refer to corresponding parts throughout the several views of the drawings.

As described above, in many existing internet media delivery schemes, a media service provider serves as a media content carrier, and specifically, inserts in a webpage or media player a script that is associated with media content provided by another content provider. The media service provider supports a media management system to manage the media content provided by the content provider. Then, when a user browses the webpage or plays the media player, the webpage or the media player automatically loads the media content in a specific format as prescribed in the script inserted in the webpage or media player, and sometimes, reports a media exposure rate back to the content provider.

However, the above media delivery schemes fail to generate desired impact on targeted customers when they are used to deliver advertisement. Specifically, when the above schemes are used to deliver images, viewers rarely remember the content of the delivered images. Some viewers even hold negative impressions against the advertisements posted on the Internet, and in this situation, excessive exposure via the above media delivery schemes can hurt the brand image and the reputation of the content provider.

In various embodiments of the present application, a media content delivery method is used by a server owned by a media service provider to deliver media content to a client device. In some embodiments, the server receives that media content and a content inquiry associated with the media content from another content provider, and then delivers the media content and the content inquiry to the client device. When a user of the client device responds to the content inquiry based on the media content, the server receives the user response to the content inquiry from the client device, and thereby updates a user account associated with the user of the client device according to the user response to the content inquiry. The server optionally continues to deliver the media content or other content according to the updated user account. When different mechanisms are used to update the user account, the media service provider of the server and the user of the client device gain incentives to deliver and receive the media content, respectively. Generally, the server delivers media content to a client device in an interactive manner, rather than blindly regardless of whether the user of the client device has received the media content, and therefore, improves the impact of the delivered media content on the user of the client device.

FIG. 1 illustrates an exemplary media content delivery system 10 that provides media content (e.g., media content and media content inquires) to a client device in an interactive manner in accordance with some embodiments of the application. Media content delivery system 10 involves a first server 12, a client device 14, and a second server 16. First server 12, client device 14 and second server 16 are controlled by a media service provider, a user and a content provider, respectively. In various embodiments of the present application, second server 16 provides media content and one or more content inquires associated with the media content, and first server 12 then manages delivery of the media content and the content inquires to client device 16 in the interactive manner. Client device 16 is configured to display the media content and the corresponding content inquires for the user of client device 14.

First server 12 provides first content that is generated by itself to client device 14, although it also manages the delivery of the media content and the content inquiries. First server 12 sends (18A) the first content that originates from its own source to client device 14, which is configured to render the first content for the user of client device 14. However, first server 12 suspends the delivery of the first content, when it is determined that the media content and the content inquires need to be sent to client device 14. In some embodiments, first server 12 receives (20) the media content and the corresponding content inquires from second server 16, and passes (18B) the received content and inquires to client device 14. Conversely, in some embodiments, first server 12 merely passes a link to client device 14, when it is determined that the media content and the content inquires need to be sent to client device 14. Client device 14 sends (22) a media content request to second server 16. Second server 16 returns (24) the media content and the corresponding content inquiries to client device 14 directly.

The content inquires are related to the media content. Examples of the content inquiries provided by second server 16 include, but are not limited to, a game, a question, a mathematic quiz, and a puzzle. When they are rendered on the display of client device 14, the user of client device 14 provides (26) a user response to the content inquires based on the media content. Specifically, in one example, the media content includes an advertisement clip, and the content inquires include a question associated with the content of the advertisement clip. The user response is created after the user has reviewed the advertisement clip, and optionally includes feedback information provided by the user after he or she reviews the advertisement clip.

Further, first server 12 updates the user's account when the user response satisfies predefined response criteria. In one example, the predefined response criteria merely require that the user response is correct in view of the media content. Stated another way, the user's account is updated (e.g., gets a bonus), because the user has successfully reviewed the media content as required by the content provider associated with second server 16. Thereafter, first server 12 and second server 16 may choose to implement other operations (e.g., continue to deliver other media content, resume providing the suspended first content) based on the updated user's account.

On the other hand, the media service provider associated with first server 12 has successfully managed the delivery of the media content when the user's account is updated according to the predefined response criteria. In some embodiments, first server 12 claims a bonus every time a user's account is updated according to the predefined response criteria. However, in some embodiments, first server 12 claims an accumulative bonus after a plurality of media content deliveries have been successfully managed. Specifically, first server 12 sends (28A) a request for the accumulative bonus to second server 16, and in response to the request, second server 16 of the content provider returns (28B) the accumulative bonus to first server 12.

As explained above, media content delivery system 10 provides the media content together with the content inquiries that are associated with the media content. More importantly, media content delivery system 10 monitors the user response to the content inquiries for the purposes of tracking whether the media content has been actually reviewed by the user of client device 14 and whether first server 12 has made an effective delivery of the media content. Thus, the content provider can deliver the media content to its targeted users effectively, and thereby, adjust its strategies for media content delivery to meet the need of its users. Such an interactive media content delivery system is particularly useful for delivering advertisement content over the Internet.

FIG. 2 illustrates a flow diagram representing a method 30 for providing media content in accordance with some embodiments of the application. Method 30 is, optionally, governed by instructions that are stored in a non-transitory computer readable storage medium and that are executed by one or more processors of a server (e.g., first server 12). Each of the operations shown in FIG. 2 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 30 may be combined and/or the order of some operations may be changed.

First server 12 determines (32) whether a predefined condition is met while providing first content to a remote client, e.g., client device 14. The remote client is configured to render the first content on its display to a user and detect user interactions with the first content and report the user interactions to first server 12. In some embodiments, the predefined condition is met at a specific temporal point of the first content (e.g., 30 minutes after the first content is displayed). In some embodiments, the predefined condition is met when part of the first content that is currently displayed at the moment is associated with a specific topic or a specific keyword.

When it is determined that the predefined condition is met, first server 12 implements (34) a series of operations to deliver media content provided by a second server 16 in an interactive manner. Specifically, first server 12 suspends (36) providing the first content to the remote client, and obtains (38) media content and one or more content inquiries from second server 16 that is distinct from the first server. In one example, the first content is suspended in order to show an advertisement clip relevant to the first content.

In various embodiments of the present application, the content inquiries provided by the second server may include at last one of a feedback, a game, a question, a mathematic quiz, a puzzle and the like, and such content inquiries are associated with the media content.

After obtaining the media content and the content inquiries, first server 12 provides (40) the media content and the content inquiries to the remote client, and the remote client system is configured to render the media content and the content inquiries on its display to the user and receive user responses to the content inquires. In some embodiments, the media content and the content inquires are rendered on the display of the remote client based on a mobile operating system selected from Android, iOS, Blackberry, Windows Phone and the like.

First sever 12 then receives (42) the user responses to the content inquires from the remote client, and updates (44) the user's account based on the user responses to the content inquires when the user responses satisfy predefined response criteria. In some embodiments, in accordance with the predefined response criteria, the user responses are consistent with a predetermined answer stored in the first server for the media content displayed on the remote client. In some embodiments, in accordance with the predefined response criteria, the user responses have been received from the user's account in response to the same media content for a limited number of times, and the limited number is less than a predetermined value. In some embodiments, in accordance with the predefined response criteria, the user responses have been received from the client system within a period of time since the content inquiries are rendered on the display of the remote client, and this period of time is shorter than a predetermined threshold duration.

In some embodiments, the user's account is updated by assigning a bonus to the user's account, and the bonus is selected from a virtual good group that consists of virtual currency, a virtual gift, a virtual pet, and virtual points. Specifically, in some embodiments, the first content is associated with a computer game, and the user's account is updated by upgrading the user's account to a higher level for the computer game. Stated another way, the user's account on first server 12 is awarded for reviewing the media content and completing the content inquiries.

In some embodiments, in accordance with updating the user's account, first server 12 sends to second server 16 a request for a service credit (e.g., an accumulative bonus) for providing the media content and the content inquiries to the remote client. Specifically, the accumulative bonus is associated with amount of service first server 12 provides to present the media content on behalf of the second server during a duration of time. Therefore, in some embodiments, the user's account is updated by assigning a bonus for providing the user responses that satisfy the predefined response criteria, and the accumulative bonus is calculated at least based on this bonus for the user's account. Further, in some embodiments, first server 12 manages to deliver media content provided by second server 16 to a plurality of user accounts including this user's account, and the accumulative bonus is calculated based on a plurality of bonuses for the plurality of user accounts, including the bonus for this user's account.

After updating the user's account, first server 12 resumes (46) providing the first content to the remote client based on the updated user account. In some embodiments, when the first content is resumed on the remote client, the user's account associated with the first content has been rewarded for reviewing the media content and completing the content inquiries. For example, when the first content is associated with a computer game, the user's account is upgraded to a higher level for the computer game. Therefore, the user's account on first server 12 is awarded for reviewing the media content provided from second server 16.

It should be understood that the particular order in which the operations in FIG. 2 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 30 (e.g., FIG. 2) are also applicable in an analogous manner to method 100 described below with respect to FIG. 3. For brevity, these details are not repeated here.

Figure 3:
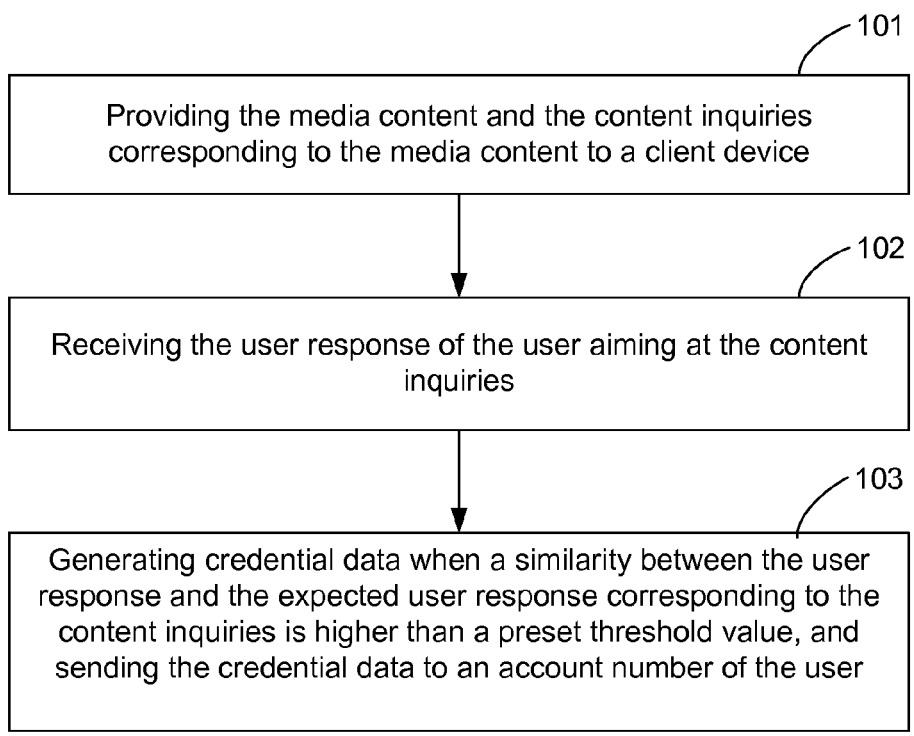
FIG. 3 illustrates a flow diagram representing another method for providing media content interactively in accordance with some embodiments of the application.

FIG. 3 illustrates a flow diagram representing another method 100 for providing media content interactively in accordance with some embodiments of the application. Method 100 is, optionally, governed by instructions that are stored in a non-transitory computer readable storage medium and that are executed by one or more processors of a server (e.g., first server 12). Each of the operations shown in FIG. 3 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 30 may be combined and/or the order of some operations may be changed.

Referring to FIG. 3, method 100 includes: another server that provides the media content (e.g., second server 16) associates media content with content inquiries, and associates the content inquiries with one or more expected user responses. The media content refers to media of various types that need to be delivered to an interested user. For example, the media content may be multimedia content including words, sounds, images, videos, and the like. On the other hand, the content inquiries are associated with the media content that is rendered for display on a client device, and the user of the client device gives a user response to the content inquiries. For example, the content inquiries may be questions extracted based on the media content and shown in a format selected from a multiple choice, a true or false question, a fill-in question and the like. In some embodiments, the content inquiries include a question related to the media content, and the expected user response is a standard answer corresponding to the question.

In accordance with method 100, first server 12 provides (101) the media content and the content inquiries corresponding to the media content to client device 14. Here, the server sends the media content and the content inquiries corresponding to the media content to client devices, and then the media content and the content inquiries may be provided to one or more client devices.

In some embodiments, the client devices include, but are not limited to, mobile phones, smart phones, Palm handheld computers, personal computer (PC), tablet computers or personal digital assistants (PDA), and the like. Although the foregoing lists specific examples of the client devices in details, those skilled in the art may aware that these listings are for a description purpose only, and are not intended to limit the protection scope of the embodiments of the present application.

The client devices may adopt any intelligent client device operating system, and the specific operating systems that can be adopted include, but are not limited to, Android, Palm OS, Symbian, Windows mobile, Linux, iPhone (Apple) OS, Black Berry OS 6.0, Windows Phone series and the like. Specifically, in some embodiments, an Android operating system is used in client device 16. In particular, various versions of Android operating systems can be used in the client devices, and the various versions include, but are not limited to, Astro (Android Beta), Bender (Android 1.0), Cupcake (Android 1.5), Donut (Android 1.6), Eclair (Android 2.0/2.1), Froyo (Android 2.2), Gingerbread (Android 2.3), Honeycomb (Android 3.0), Ice Cream Sandwich (Android 4.0), Jelly Bean (Jelly Bean, Android 4.1) and the like.

It is noted that the foregoing merely lists specific versions of the Android platform in details. Those skilled in the art may aware that the embodiments of the present application are not limited to the foregoing versions listed only, and may also use any other version based on an Android software architecture.

After providing the media content and the content inquiries, first server 12 receives (102) the user response that the user enters on client device 14 in response to the content inquiries. Then, first server 12 generates (103) credential data, when it determines that a similarity between the user response and the expected user response corresponding to the content inquiries is higher than a preset threshold value. Further, first server 12 associates the credential data to the user's account on first server 12. Stated another way, in some embodiments, first server 12 updates the user's account by generating the credential data and associating them with the user's account.

Specifically, after receiving the user response, first server 12 determines whether the similarity between the user response and the expected user response corresponding to the content inquiries is higher than the preset threshold value. If yes, first server 12 determines that the user response is correct, and then generates the credential data. First server 12 further sends the credential data to the user's account. However, if first server 12 determines that the user response is incorrect, it does not generate the credential data, but sends an error message to client device 14.

In some embodiments, the content inquiries are presented as multiple choices or true or false questions, and the similarity between the user response and the expected user response corresponding to the content inquiries is determined to be higher than the preset threshold value, when the user response is identical to the expected user response corresponding to the content inquiries.

In some embodiments, the content inquiries are presented as fill-in questions. The user response does not need to be completely identical to the expected user response corresponding to the content inquiries. Rather, the returned result can be determined to be correct when the similarity between the user response and the expected user response corresponding to the content inquiries reaches the preset threshold value.

In various embodiments of the application, the credential data may be an electronic money coupon, a credit, or a virtual object coupon. For example, the credential data may be associated with virtual electronic money, user points, virtual electronic pet, virtual electronic gift and the like. Specifically, the virtual electronic money is associated with an encrypted sequence of numbers that represent a change of monetary amount applicable to the user's account. The user points are associated with a level of experience for the user's account in a computer game. The virtual electronic pet refers to a specific program operated on a computer or an internet server, and has some biotic characteristics that mimic those of a real pet. The virtual gift is a virtual good used by virtual roles in a virtual internet world to express affection to each other. Exemplary virtual gifts include digital flowers, virtual equipment in a game, and game coins.

In some embodiments, method 100 for providing media content interactively further includes setting a media content releasing manner and a media content releasing region. As such, the media content is provided in the releasing region according to the media content releasing manner.

In some implementations, the content inquiries corresponding to the media content are provided to client device 14 after the media content has been provided to client device 14.

In some embodiments, after receiving the user response of the user in response to the content inquiries, first server 12 first determines whether the user response is legal, and in accordance with a determination of an illegal response, discards the illegal user response. Furthermore, in some implementations, to determine whether the user response is legal, first server 12 determines whether it take first server 12 a generation time greater than a preset time threshold value to generate the user response. If it is determined that the generation time is shorter than the preset time threshold value, the user response is determined as legal. Otherwise, first server 12 determines that the user response is illegal.

In some implementations, to determine whether the user response is legal, first server 12 tracks how many times first server 12 has received the user response from client device 14 and determines whether the number of times exceeds a preset receiving times threshold value. When the number of times exceeds the preset receiving times threshold value, it is determined that the user response is illegal; otherwise, it is determined that the user response is legal.

A system for implementing method 100 for providing media content interactively is optionally divided into multiple modules according to the corresponding functions. For example, this system includes a media management module, an interaction module and a credential data management module.

In some implementations, a media service provider assigns to the media management module a media delivery function which includes receiving media content (e.g., figures and video clips), pricing models (e.g., CPM, CPA, CPC and CPS), destination information (e.g., region, platform, operating system and broadcast time), frequency information, duration of the media content, and webpage address after clicking. The media delivery function also includes generating questions and answers based on the media content or the content of the webpage associated with the webpage address after clicking. Optionally, the generated questions have a choice question form, and the media content is associated with one or more questions. In some implementations, the media delivery function further includes updating the user's account by granting the account with extra credits and bonus when the corresponding user clicks on the link to the webpage address and registers on the corresponding webpage. First server 12 of the media service provider then stores the above information associated with this user's account in a database.

On the other hand, the interaction module is used to provide the media content and the corresponding content inquires to client device 14. The interaction module renders the media content for display on client device 14 within a prescribed duration, and presents the content inquires following the media content. After the user chooses an answer in response to the content inquiries, the interaction module sends the answer and a corresponding question number associated with the content inquires back to the background of first server 12 to verify the correctness of the answer. In accordance with the correctness of the answer, the interaction module determines credits (i.e., credential data) and save the credits in the user's account. Subsequently, the interaction module optionally moves to display the next media content and corresponding content inquires.

In some embodiments, the credit management and reward module is used to record credit information (i.e., credential data) for a user's account. The corresponding credits are earned through computer games or reviewing the provided media content, and can be exchanged with money or other articles.

In some embodiments, the credential data management module is used to count displayed times and clicked times of each media content, and track the subsequent triggered actions (e.g., user registration or purchase order) of the webpage after the media is clicked on. In some embodiments, the credential data management module is used to deter spamming. Anti-spamming operation includes randomly selecting content inquires displayed each time, setting a time for the user to continuously answering the questions that shall not be smaller than the preset time threshold value, setting the answering times for the user for the questions of each media that shall not exceed the preset receiving times threshold value (e.g., 4 times), prohibiting client device 14 from skipping the media content, and/or ensuring that the media content is displayed for at least a predetermined duration.

It should be understood that the particular order in which the operations in FIG. 3 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 100 (e.g., FIG. 3) are also applicable in an analogous manner to method 30 described above with respect to FIG. 2. For brevity, these details are not repeated here.

Figure 4:
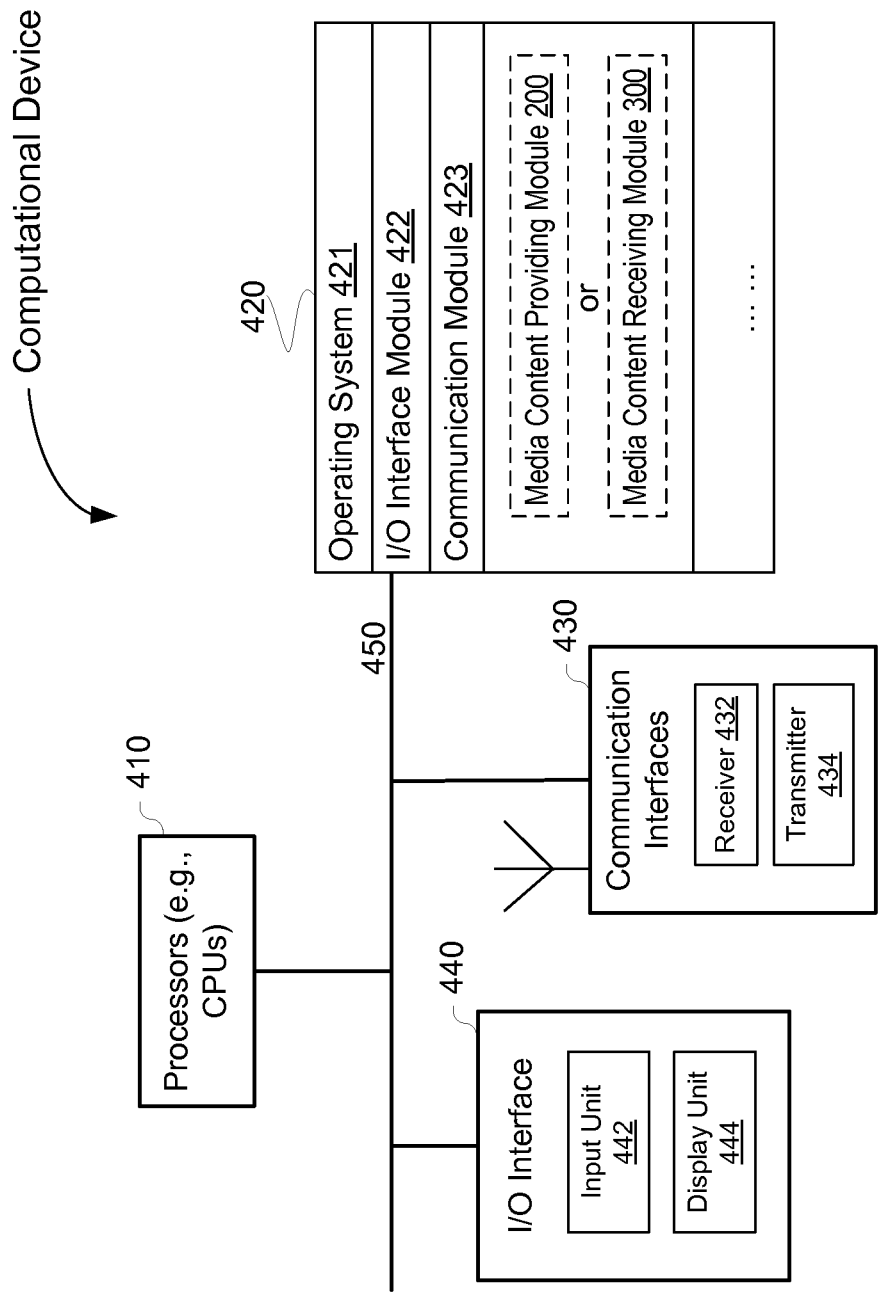
FIG. 4 illustrates a block diagram of a computational device (e.g., a server or a client device) in accordance with some embodiments of the application.

FIG. 4 illustrates a block diagram of a computational device (e.g., a server 12 or a client device 14) in accordance with some embodiments of the application. In some implementations, the computational device at least includes one or more processors 410 (e.g., central processing units) and a memory 420 for storing data, programs and instructions for execution by one or more processors 410. In some implementations, the computational device further includes one or more communication interfaces 430, an input/output (I/O) interface 440, and one or more communication buses 450 that interconnect these components.

In some embodiments, I/O interface 440 includes an input unit 442 and a display unit 444. Examples of input unit 442 include a keyboard, a mouse, a touch pad, a game controller, a function key, a trackball, a joystick, a microphone, a camera and the like. Additionally, display unit 444 displays information that is inputted by the user or provided to the user for review. Examples of display unit 444 include, but are not limited to, a liquid crystal display (LCD) and an organic light-emitting diode (OLED) display. In some implementations, input unit 442 and display unit 444 are integrated on a touch-sensitive display that displays a graphical user interface (GUI).

In some embodiments, communication buses 450 include circuitry (sometimes called a chipset) that interconnects and controls communications between system components. In some embodiments, communication interfaces 430 further include a receiver 432 and a transmitter 434.

In some embodiments, memory 420 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 420 includes one or more storage devices remotely located from the one or more processors 410. In some embodiments, memory 420, or alternatively the non-volatile memory device(s) within memory 420, includes a non-transitory computer readable storage medium.

In some embodiments, memory 420 or alternatively the non-transitory computer readable storage medium of memory 420 stores the following programs, modules and data structures, instructions, or a subset thereof:

- Operating System 421 that includes procedures for handling various basic system services and for performing hardware dependent tasks;
- I/O interface module 422 that includes procedures for handling various basic input and output functions through one or more input and output devices, wherein I/O interface module 402 further includes an interface display module that controls displaying of a graphical user interface; and
- Communication module 423 that is configured to connect the computational device to other computational devices (e.g., servers and client devices), via one or more network communication interfaces 450 (wired or wireless) and one or more communication networks, such as the Internet, other wide area networks, local area networks, metropolitan area networks, and so on.

In some implementations, the computational device is associated with first server 12 and further includes a media content providing module 200. Media content providing module 200 provides first content to a remote client, and when a predefined condition is satisfied, suspends providing the first content for providing media content and content inquiries to the remote client. In accordance with a user response to the content inquiries, first server 14 updates a user's account when the user responses satisfy predefined response criteria, and resumes providing the first content to the remote client based on the updated user account 36. In some embodiments, media content providing module 200 further includes a media management module, an interaction module and a credential data management module. More details on media content providing module 200 and its modules are explained above with reference to FIGS. 1-3 and 5A.

In some implementations, the computational device is associated with client device 14 and further includes a media content receiving module 300. Client device 14 receives the media content and the content inquiries that are associated with the media content. Client device 14 further receives inputs from the user as a user response to the content inquiries, and returns the user response to the content inquiries to first server 12. More details on media content receiving module 300 and its modules are explained above with reference to FIGS. 1-3 and 5B.

Figure 5A:
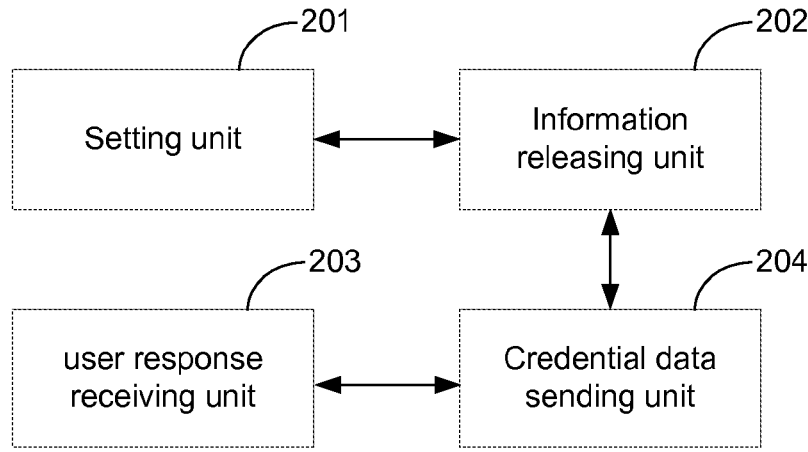
FIG. 5A illustrates a block diagram of a media content providing system of a server in accordance with some embodiments of the application.

FIG. 5A illustrates a block diagram of a media content providing system 200 of a server in accordance with some embodiments of the application. Media content providing system 200 includes a setting unit 201, an information releasing unit 202, a user response receiving unit 203 and a credential data sending unit 204.

Setting unit 201 is configured to associate media content and content inquiries, and further associate the content inquiries with an expected user response.

Information releasing unit 202 is configured to provide the media content and the content inquiries corresponding to the media content. User response receiving unit 203 is configured to receive a user response of a user in response to the content inquiries. Credential data sending unit 204 is configured to generate credential data when a similarity between the user response and the expected user response corresponding to the content inquiries is higher than a preset threshold value. Credential data sending unit 204 is configured to send the credential data to an account number of the user.

In some embodiments, setting unit 201 is further configured to set a media content releasing manner and a media content releasing region. Information releasing unit 202 is configured to release the media content according to the media content releasing manner, and release the content inquiries corresponding to the media content after the media content is released.

In some embodiments, user response receiving unit 203 is further configured to, after receiving the user response of the user in response to the content inquiries, determine whether the user response is legal and discard an illegal user response.

In some embodiments, user response receiving unit 203 is configured to determine whether a generation time for the user response is greater than a preset time threshold value. The generation time represents a length of a duration taken to generate the user response by client device 14. If this generation time exceeds the present time threshold value, it is determined that the user response is legal; otherwise, it is determined that the user response is illegal.

In some embodiments, user response receiving unit 203 is configured to determine whether receiving times of the same user response is greater than a preset receiving times threshold value. The receiving times of the user response represents the number of times the content inquires has been responded by client device 14. If the receiving times of the user response exceeds the preset receiving times threshold value, it is determined that the user response is illegal; otherwise, it is determined that the user response is legal.

In one specific example of providing the media content in an interactive manner are implemented according to the following steps:

1. First server 12 of a media service provider places media content, corresponding content inquires and expected user responses in information releasing unit 202.
2. A user logs on an interaction program, enters the interaction program to specify types of the media content and difficulty levels of the content inquiries, prepares to browse corresponding media content, and prepares to respond to the content inquiries.
3. After the interaction program is started, the interaction program sends a user request to information releasing unit 202, with information concerning the types of the media content, the difficulty levels of the content inquiries for the content inquiries and other information.
4. Information releasing unit 202 randomly selects the media content that is not seen by the user and matches the user request, and returns the selected media content and the corresponding content inquiries to the interaction program.
5. The interaction program, after receiving the media content and the content inquiries that need to be displayed, displays the media content in an interaction program interface. A displaying time is a duration set by the media service provider. When the displaying time runs out, the media content is temporarily suspended. At this time, the media content and the content inquiries associated with the media content may be displayed in the interaction program interface as well.

6. The user enters a user response based on the media content that has been played. The user response is optionally related to the media content that has been displayed and a webpage associated with the media content. By these means, the user gains more impression on the media content by completing the content inquiries.

7. After the user provides the user response, the interaction program interface may send the user response and an identifier of the content inquires to feedback result receiving unit 203 for verification. If the user response is consistent with a predetermined expected user response, credits may be accumulated and saved for a corresponding user account.

8. Then, above steps 4-7 are repeated until the user quits the interaction program of the game.

9. When the credits of the user reach a level specified by first server 12, the credits may be exchanged into money or other prizes. As such, user experience is enhanced by engaging the user using the content inquiries.

10. After the media content is displayed, the media content provider may claim an accumulative bonus from the content provider for using its own platform to deliver and promote content (including the media content) provided by the content provider in this interactive manner.

In some embodiments, the content inquiries are delivered with the media content for some non-promotion purposes. For example, essay questions (e.g., mathematics questions and brain teasers) are used to increase the difficulty level of the content inquiries. Moreover, the form of the interaction program may be changed from a question-answer form to other interaction form, such as forms of finding media materials of different types, or puzzle, etc.

Figure 5B:
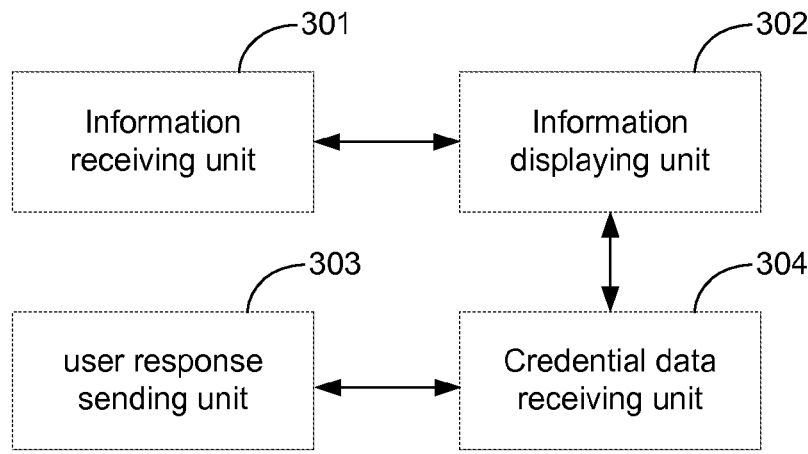
FIG. 5B illustrates a block diagram of a media content receiving system of a client device in accordance with some embodiments of the application.

FIG. 5B illustrates a block diagram of a media content receiving system 300 of a client device (e.g., client device 14) in accordance with some embodiments of the application. Client device 14 includes an information receiving unit 301, an information displaying unit 302, a user response sending unit 303 and a credential data receiving unit 304.

Information receiving unit 301 is configured to receive media content and content inquiries corresponding to the media content. Information displaying unit 302 is configured to display the media content and the content inquiries corresponding to the media content. User response sending unit 303 is configured to send a user response of a user aiming at the content inquiries. Credential data receiving unit 304 is configured to receive credential data, and credential data are generated when a similarity between the user response and the expected user response corresponding to the content inquiries is higher than a preset threshold value.

In some embodiments, information displaying unit 302 is configured to provide media content in a preset releasing region according to a preset media content releasing manner, and display the content inquiries corresponding to the media content after the media content is displayed.

Figure 6:
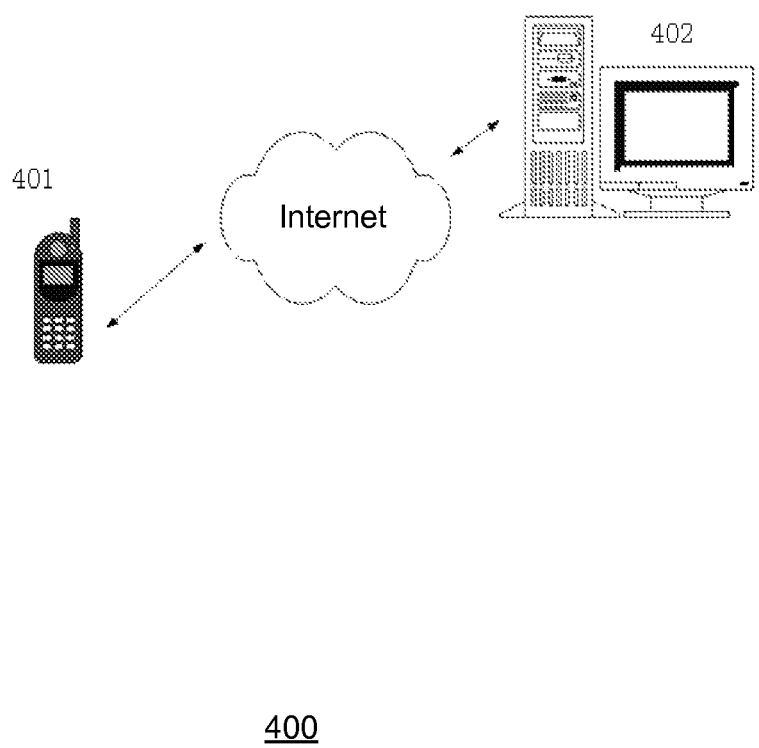
FIG. 6 illustrates another exemplary media content delivery system that provides media content (e.g., media content and media content inquires) to a client device in an interactive manner in accordance with some embodiments of the application.

FIG. 6 illustrates another exemplary media content delivery system 400 that provides media content (e.g., media content and media content inquires) to a client device in an interactive manner in accordance with some embodiments of the application. Media content delivery system 400 includes a client device 401 (e.g., client device 14) and a server 402 (e.g., first server 12). Server 402 is configured to associate media content with content inquiries, associate the content inquiries with expected user responses, and send the media content and the content inquiries corresponding to the media content to client device 401. Client device 401 is configured to display the media content and the content inquiries corresponding to the media content, receive a user response of a user in response to the content inquiries, and return the user response to server 402. Further, server 402 is configured to generate credential data when a similarity between the user response and the expected user response corresponding to the content inquiries is higher than a preset threshold value, and associate the credential data with a user account that is optionally identified by an account number.

In some embodiments, server 402 is further configured to, after receiving the user response of the user aiming at the content inquiries, determine whether the user response is legal, and discard an illegal user response.

In some embodiments, server 402 is configured to determine whether a generation time of the user response is greater than a preset time threshold value; if yes, determining that the user response is legal; otherwise, determining that the user response is illegal.

In some embodiments, server 402 is configured to determine whether receiving times of the same user response is greater than a preset receiving times threshold value; if yes, determining that the user response is illegal; otherwise, determining that the user response is legal.

Various embodiments of media content providing/receiving methods and media content delivery systems in this application are optionally performed via different forms.

For example, according to a certain specification of application interface, a media content receiving method is implemented as a plug-in program installed in a personal computer, a mobile client device and the like. Moreover, the media content receiving method may also be packaged in a software application that the user could download and use. When the method is written as a plug-in program, the method may be performed as multiple plug-in forms such as ocx, dll, cab and the like. In particular, the media content providing/receiving method proposed according to the embodiments of the present application is optionally performed through specific technologies as a Flash plug-in, a RealPlayer plug-in, an MMS plug-in, an MIDI staff plug-in, ActiveX and the like.

The media content providing/receiving method proposed according to the embodiments of the present application may be stored on various storage mediums through a storage manner of instruction or instruction set storage. The storage mediums include, but are not limited to: floppy disk, optical disk, DVD, hard disk, flash memory, USB flash disk, CF card, SD card, MMC card, SM card, memory stick, xD card and the like.

In addition, the media content providing/receiving method proposed according to the embodiments of the present application may also be applied to a storage medium based on a NAND flash, such as USB flash disk, CF card, SD card, SDHC card, MMC card, SM card, memory stick, xD card and the like In various embodiments of the present application, a media content providing method includes setting the correspondence relationship between the media content and the content inquiries, and setting the correspondence relationship between the content inquiries and the expected user response. The media content providing method further includes: providing the media content and the content inquiries corresponding to the media content, receiving the user response from the user in response to the content inquiries, generating the credential data when the similarity between the user response and the expected user response corresponding to the content inquiries is higher than the preset threshold value, and sending the credential data to the account number of the user. It can be seen that the embodiments of the present application are distinct from one-way media content delivery of the prior art. Rather, in various embodiments of the present application, the user may interact with the media service provider in response to the media content, and therefore, the interaction efficiency among the media service provider, the content provider and the user is improved.

The foregoing descriptions are merely exemplary embodiments of the present application, but are not intended to limit the protection scope of the present application. Any variation, equivalent replacement and improvement figured out within the spirits and principles of the present application shall fall within the protection scope of the present application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the application herein is for the purpose of describing particular embodiments only and is not intended to be limiting of the application. As used in the description of the application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the application to the precise forms disclosed. Many modifications and variations are possible in view of the above teachings. The implementations were chosen and described in order to best explain principles of the application and its practical applications, to thereby enable others skilled in the art to best utilize the application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method for providing media content, comprising:
on a first server having one or more processors and memory storing one or more programs for execution by the one or more processors:
determining whether a predefined condition is met while providing first content to a remote client, wherein the remote client is configured to render the first content on its display to a user and detect user interactions with the first content and report the user interactions to the first server;
in accordance with a determination that the predefined condition is met:
suspending providing the first content to the remote client;
obtaining the media content and one or more content inquiries from a second server that is distinct from the first server, wherein the one or more content inquiries are associated with the media content;
providing the media content and the content inquiries to the remote client, wherein the remote client system is configured to render the media content and the content inquiries on its display to the user and receive user responses to the content inquires;
receiving the user responses to the content inquires from the remote client;
updating the user's account based on the user responses to the content inquires when the user responses satisfy predefined response criteria; and resuming providing the first content to the remote client based on the updated user account.

2. The method of claim 1, further comprising:
in accordance with updating the user's account, sending to the second server a request for a service credit for providing the media content and the content inquiries to the remote client.

3. The method of claim 1, wherein the content inquiries provided by the second server include at last one of a feedback, a game, a question, a mathematic quiz, a puzzle and the like.

4. The method of claim 1, wherein the media content further comprises an advertisement clip, and the content inquires further comprise a question associated with the content of the advertisement clip, and wherein the user responses are created after the user has reviewed the advertisement clip.

5. The method of claim 1, wherein the media content provided by the second server comprises an advertisement clip, and the user responses comprise feedback information provided by the user after her or she reviews the advertisement clip.

6. The method of claim 1, wherein updating the user's account further comprises assigning a bonus to the user's account, and the bonus is selected from a virtual good group that consists of virtual currency, a virtual gift, a virtual pet, and virtual points.

7. The method of claim 1, wherein the first content is associated with a computer game, and updating the user's account further comprises upgrading the user's account to a higher level for the computer game.

8. The method of claim 1, wherein an accumulative bonus is associated with amount of service the first server provides to present the media content on behalf of the second server during a duration of time, the method further comprising:
updating the user's account by assigning a bonus for providing the user responses that satisfy the predefined response criteria; and
calculating the accumulative bonus at least based on the bonus for the user's account.

9. The method of claim 8, wherein the accumulative bonus is calculated based on a plurality of bonuses for a plurality of user accounts, including the bonus for the user's account.

10. The method of claim 1, wherein in accordance with the predefined response criteria, the user responses are consistent with a predetermined answer stored in the first server for the media content displayed on the remote client.

11. The method of claim 1, wherein the media content and the content inquires are rendered on the display of the remote client based on a mobile operating system selected from Android, iOS, Blackberry, Windows Phone and the like.

12. The method of claim 1, wherein in accordance with the predefined response criteria, the user responses have been received from the user's account in response to the same media content for a limited number of times, and the limited number is less than a predetermined value.

13. The method of claim 1, wherein in accordance with the predefined response criteria, the user responses have been received from the client system within a period of time since the content inquiries are rendered on the display of the remote client, and this period of time is shorter than a predetermined threshold duration.

14. A server system, wherein the server system comprises a first server, comprising:
one or more processors; and
memory having instructions stored thereon, which when executed by the one or more processors cause the processors to perform operations comprising:
determining whether a predefined condition is met while providing first content to a remote client, wherein the remote client is configured to render the first content on its display to a user and detect user interactions with the first content and report the user interactions to the first server;
in accordance with a determination that the predefined condition is met:
suspending providing the first content to the remote client;
obtaining media content and one or more content inquiries from a second server that is distinct from the first server, wherein the one or more content inquiries are associated with the media content;
providing the media content and the content inquiries to the remote client, wherein the remote client system is configured to render the media content and the content inquiries on its display to the user and receive user responses to the content inquires;
receiving the user responses to the content inquires from the remote client;
updating the user's account based on the user responses to the content inquires when the user responses satisfy predefined response criteria; and
resuming providing the first content to the remote client based on the updated user account.

15. The server system of claim 14, wherein the media content further comprises an advertisement clip, and the content inquires further comprise a question associated with the content of the advertisement clip, and wherein the user responses are created after the user has reviewed the advertisement clip.

16. The server system of claim 14, wherein the first content is associated with a computer game, and updating the user's account further comprises upgrading the user's account to a higher level for the computer game.

17. The server system of claim 14, wherein the media content and the content inquires are rendered on the display of the remote client based on a mobile operating system selected from Android, iOS, Blackberry, Windows Phone and the like.

18. The server system of claim 14, wherein in accordance with the predefined response criteria, the user responses have been received from the user's account in response to the same media content for a limited number of times, and the limited number is less than a predetermined value.

19. The server system of claim 14, wherein in accordance with the predefined response criteria, the user responses have been received from the client system within a period of time since the content inquiries are rendered on the display of the remote client, and this period of time is shorter than a predetermined threshold duration.

20. A non-transitory computer-readable medium, having instructions stored thereon, which when executed by one or more processors cause the processors to perform operations comprising:
determining whether a predefined condition is met while providing first content to a remote client, wherein the remote client is configured to render the first content on its display to a user and detect user interactions with the first content and report the user interactions to the first server;
in accordance with a determination that the predefined condition is met:

suspending providing the first content to the remote client;
obtaining media content and one or more content inquiries from a second server that is distinct from the first server, wherein the one or more content inquiries are associated with the media content;
providing the media content and the content inquiries to the remote client, wherein the remote client system is configured to render the media content and the content inquiries on its display to the user and receive user responses to the content inquires;
receiving the user responses to the content inquires from the remote client;
updating the user's account based on the user responses to the content inquires when the user responses satisfy predefined response criteria; and
resuming providing the first content to the remote client based on the updated user account.

* * * * *